Feb. 3, 1925.
R. CARLSTEDT
1,525,068
METHOD OF AND APPARATUS FOR AUTOMATIC CONTROL
Filed March 27, 1924
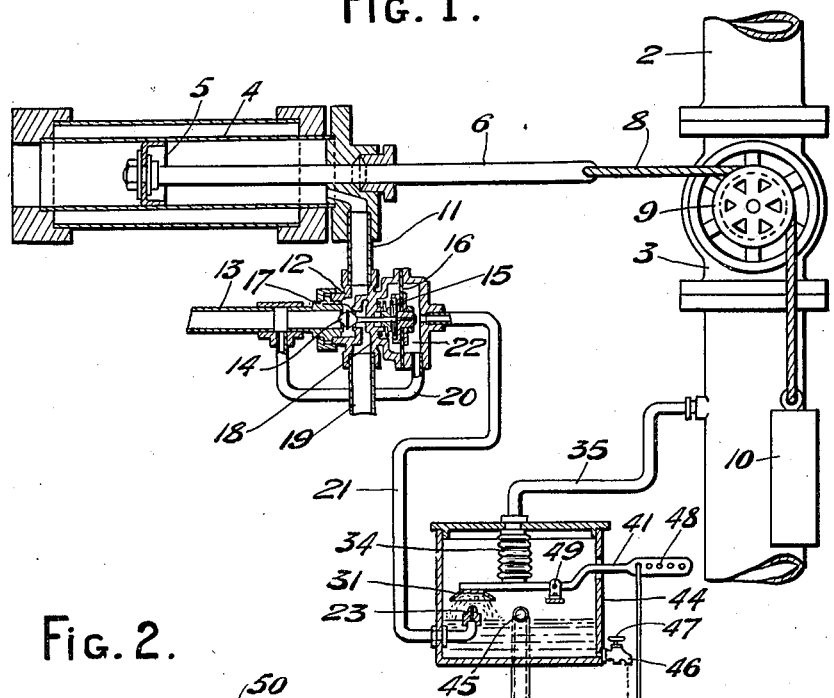
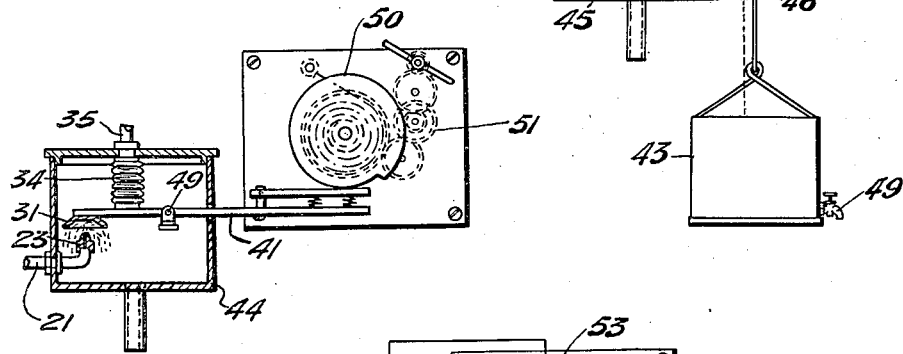
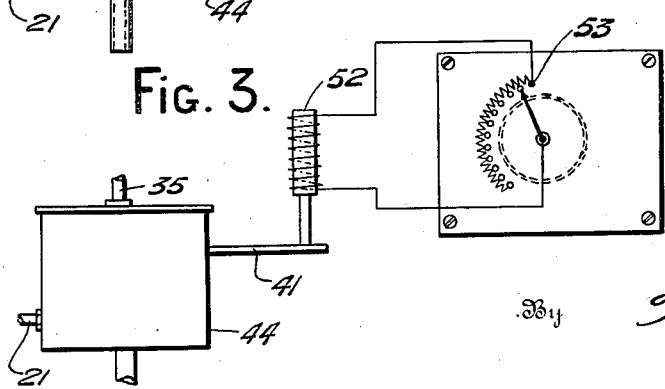
Inventor
Ragnar Carlstedt
By Wm J Nedlund
his Attorney Patented Feb. 3, 1925.

1,525,068

UNITED STATES PATENT OFFICE.

RAGNAR CARLSTEDT, OF STOCKHOLM, SWEDEN, ASSIGNOR, BY MESNE ASSIGNMENTS, TO ARCA REGULATORS, INCORPORATED, OF NEW YORK, N. Y., A CORPORATION OF VIRGINIA.

METHOD OF AND APPARATUS FOR AUTOMATIC CONTROL.

Application filed March 27, 1924. Serial No. 702,477.

*To all whom it may concern:*

Be it known that I, RAGNAR CARLSTEDT, a subject of the King of Sweden, residing at Stockholm, Sweden, have invented certain new and useful Improvements in Methods of and Apparatus for Automatic Control; and I do hereby declare the following to be a full, clear, and exact description of the invention, such as will enable others skilled in the art to which it appertains to make and use the same, reference being had to the accompanying drawings, forming a part hereof, wherein like numerals designate like parts.

The present invention relates to a means for progressive automatic control of the kind having a mechanism connected with a main control member such as a valve for that which is to be regulated, which mechanism is under the influence of a pressure liquid such as water, oil or the like, permanently flowing in a conduit, the flow of such liquid being checked more or less by a movable element operated in response to impulses in the medium to be controlled and thus effecting adjustment of the main control member.

The present invention has for its purpose to provide an apparatus of the type set forth wherein a gradual variation of condition, as a gradual progressive increase or decrease of flow of steam in a conduit, is obtained and at the same time preventing fluctuations or variations in or deviations from the desired progressive proportions of variation.

With this object in view and others which will be apparent as the description proceeds, the present device consists in the automatic control hereinafter described and particularly pointed out in the appended claims.

In the drawing, which illustrates preferred embodiments of the invention:

Figure 1 shows a diagrammatic organization view of the elements comprising my invention with one form of progressive control, adapted to control the flow of steam in a steam conduit.

Fig. 2 shows a modification wherein the progressive control is effected by means of a clock mechanism.

Fig. 3 shows another form of progressive control, embodying a solenoid.

Referring to Figure 1, 2 denotes a steam conduit through which the steam flows which is to be controlled. In the conduit 2 is provided the valve 3 regulated by means of the rope 8, or the like running over a pulley 9 fastened to the spindle of the valve. The rope 8 is connected with the rod 6 of the piston 5 movable in cylinder 4 and has associated therewith a counterweight 10 acting as hereinafter described. By this means the position of valve 3 is dependent on the position of the piston 5. On its right hand side the piston 5 is actuated by the pressure of a liquid in the cylinder 4 which pressure tends to move the piston 5 to the left. Opposed to this tendency to move the piston is the counterweight 10 attached to the rope 8. The piston 5 and associated parts constitute a liquid-pressure operated servo-motor adapted to regulate the position of the valve 3.

The pressure of the liquid acting in the cylinder 4 is effected in the following manner: One end of pipe 11 opens into the cylinder 4, the other end of said pipe being connected to a valve device, which I term an actuating means. This valve device consists of a casing 12 into which a pipe 13 enters through which water or other liquid under pressure may be supplied to the actuating means. The end of the pipe 13 located within the casing 12 is situated opposite, and its opening is controlled by means of a valve 14 which is rigidly connected with a diaphragm 16 secured in the casing 12 and acted upon by a spring 15. The pipe 13 communicates with the pipe 11 and with a waste pipe 19 through an opening 17 in the partition 18 in the casing 12 which opening 17 is also controlled by the valve 14. The supply pipe 13 is connected with a pipe 20 communicating with a chamber 22 in the valve casing 12 having, for one side, the diaphragm 16. A pipe 21 communicates at one end with the chamber 22 and at its other end is provided with a discharge nozzle 23 situated in a relay 44.

The nozzle 23 discharges against a movable element 31 in the form of a baffle plate which is adapted to move toward and away from the nozzle 23 and thus regulate the jet of liquid discharging through this nozzle. The baffle plate 31 is arranged upon a lever 41 pivoted at 49 on a fixed support within the relay. At the opposite end of the lever 41 there is arranged a series of holes 48 which serve to suspend a container 43 having water in the same which tends to exert a downward pull on the right hand side of the lever 41. This downward pull is opposed by the pressure of steam acting in the bellows 34. The bellows 34 communicates by means of conduit 35 with the conduit 2 whereby impulses in the medium within the conduit 2 are transmitted to the bellows 34 and influence the movement of the lever 41. A constant level of water is maintained in the relay 44 by means of an over-flow pipe 45. This relay is provided with a second discharge 46 whereby, by means of a valve or cock 47, the discharge fluid may be regulated. The fluid discharged through valve 47 flows into the container 43.

By means of holes 48, the container 43 can be arranged closer to, or farther from, the pivot points 49 of the lever arm thus affording adjustment of regulation.

Since in this embodiment the pressure liquid flowing through the nozzle 23 into the relay 44 is all at the same level, it is obvious that the flow through the discharge 46 is at a constant rate of speed which may be regulated as desired by means of valve 47. By this means, if the cock 49 in the container 43 is closed, the weight of the container 43 increases in definite, regulable proportion; the result of which is that its action in opposing the steam pressure in the bellows 34 increases in corresponding degree. By this means the discharge through nozzle 23 is increased, which, in turn, effects a corresponding variation of the flow through pipe 2. By adjusting the valve 47 and the container 3 on the lever arm it is possible to regulate the desired variation in many ways; such regulation being desirable, for example, in gradual heating operations by means of steam, as in cellulose boilers.

The apparatus described operates in the following manner:

Steam pressure in the bellows 34 controls the movement of the lever 41 and baffle plate 31 toward or away from the nozzle 23, this pressure being opposed by the weight of container 43 and its contents above described. The movement of baffle plate 31 toward or away from the nozzle 23 causes, by means of its throttling action on the liquid flowing through the same, a change of pressure in chamber 22. This change of pressure actuates the diaphragm 16 which, in turn, operates to move the valve 14 to admit pressure liquid to the servo-motor 4 or the discharge from the servo-motor 4 through the waste pipe 19. This is partly effected by the fact that the pipe 20 is of relatively small size and constitutes a throttled connection between supply pipe 13 and chamber 22.

If the pressure in conduit 2 increases above the normal momentary pressure, the baffle plate 31 is moved closer to the nozzle 23 thereby throttling the discharge therethrough. This action increases the pressure in conduit 21 and consequently in chamber 22, thereby moving the diaphragm 16 to the left and closing the communication between the supply pipe 13 and the servo-motor 4, and opening the connection between servo-motor 4 and the waste pipe 19. By this means the weight 10 is allowed to move the piston 5 to the right and consequently close the valve 3 somewhat, whereby the pressure is decreased.

If the pressure in the conduit 2 decreases below the normal momentary pressure, the baffle plate 31 is moved away from the discharge nozzle 23 through the influence of the weight of the container 43 and contents and the liquid discharging from the nozzle, which action decreases the pressure in conduit 21 and consequently in chamber 22, whereby the valve 14 is moved to the right, thereby closing the waste connection and allowing pressure liquid to enter the servo-motor through the pipe 11. Thus the piston 5 is moved to the left and the valve 3 is opened somewhat, whereby pressure increases. At the same time the increasing weight of the container 43 causes the baffle plate 31 to progressively increase in distance from the nozzle 23, so that the quantity of steam passing through the conduit 2 is progressively increased while at the same time the pressure impulses acting through the conduit 35 prevent momentary fluctuations in steam pressure.

By controlling the discharge through the cock 49 and varying the same relative to the discharge through valve 47, a progressive variation may be obtained along a curved line. By relative adjustment of valves 47 and 49, it is evident that many forms of progressive regulation may be obtained.

Fig. 2 shows another modification of my invention wherein the progressive regulation is effected by means of a cam 50 operated by clock mechanism 51. By varying the contour of the cam 50, regulation may be obtained along any curve desired.

Fig. 3 shows still another embodiment of my invention, wherein the progressive variation is obtained by means of a solenoid 52 actuated by means of a rheostat 53 operated in any desired manner by any known means.

By suitably selecting the device operating upon the lever 41, it is possible to effect a steady progressive variation, or an intermittent variation of that which is to be regulated; or, in other words, a variation which may be illustrated by a straight line or a curve or a broken line.

While I have described the best forms of my invention known to me, it is obvious that many other embodiments of my invention are possible, and many of the various parts herein shown and described may be changed and I wish it understood that the invention is not limited to the precise embodiments shown, but that it may be varied within the scope of the appended claims.

I claim:

1. Apparatus for progressive control, comprising a main control member, liquid pressure operated means to regulate said main control member, said means including a movable element, a conduit discharging liquid against said movable element, means acting on said movable element to progressively change its position with respect to the discharge of said conduit and means acting on said movable element responsive to a condition in that which is to be controlled.

2. In an apparatus for automatic control, a main control member, a servo-motor to regulate said main control member, a relay to control said servo-motor, a baffle plate associated with said relay, means to discharge a continuous jet of liquid against said baffle plate, means to move said baffle plate progressively and in response to fluctuations in the medium to be controlled.

3. In an apparatus for automatic control, a main control member, liquid pressure operated means to control said main control member, actuating means to control said first mentioned means, a relay to control said actuating means, a nozzle in said relay, a liquid communication between said nozzle and said actuating means, a baffle plate associated with said relay and adapted to control liquid discharging from said nozzle, means acting on said baffle plate responsive to impulses in the medium to be controlled and means acting on said baffle plate varying progressively with time.

4. In an apparatus for automatic control, the combination of a main control member, a liquid pressure operated servo-motor to regulate said main control member, a relay, liquid pressure operated actuating means controlled by said relay and arranged to operate said servo-motor, a baffle plate associated with said relay, a conduit discharging liquid against said baffle plate, means acting on said baffle plate responsive to impulses in the medium to be controlled, a progressively changing mechanism and means acting on said baffle plate responsive to changes in said progressively changing mechanism.

5. In an apparatus for automatic control, the combination of a main control member, a cylinder, a piston in said cylinder, a piston rod connected to said piston and adapted to operate said main control member, a relay, liquid pressure operated actuating means controlled by said relay and adapted to control a supply of liquid to said cylinder, a jet associated with said relay, a baffle plate to control discharge of liquid from said jet, means acting on said baffle plate responsive to impulses in the medium to be controlled, a progressively changing mechanism and means acting on said baffle plate responsive to changes in said progressively changing mechanism.

6. In an apparatus for automatic control, the combination of a conduit for steam, a valve in said conduit, a pulley to control the position of said valve, a cylinder, a piston for said cylinder, a piston rod for said piston, a member passing over said pulley and connected to said piston rod, a weight attached to said member, actuating means, a liquid communication between said actuating means and said cylinder, a valve in said actuating means, a liquid supply and a liquid discharge for said actuating means controlled by said valve, a chamber in said actuating means, a diaphragm forming one side of said chamber and connected to said valve, liquid communication between said supply pipe and said chamber, a nozzle, liquid communication between said chamber and said nozzle, a lever positioned in front of said nozzle and adapted to control the discharge of liquid therethrough, a bellows to move said lever, a conduit connecting said bellows with said first mentioned conduit for steam, a pivot for said lever, a movable mechanism, means to progressively alter the position of said movable mechanism, and means arranged to transmit the motion of said mechanism to said lever.

7. In an apparatus for automatic control, the combination of a conduit for steam, a valve in said conduit, a pulley to control the position of said valve, a cylinder, a piston for said cylinder, a piston rod for said piston, a member passing over said pulley and connected to said piston rod, a weight attached to said member, actuating means, a liquid communication between said actuating means and said cylinder, a valve in said actuating means, a liquid supply and a liquid discharge for said actuating means controlled by said valve, a chamber in said actuating means, a diaphragm forming one side of said chamber and connected to said valve, liquid communication between said supply pipe and said chamber, a nozzle, liquid communication between said chamber and said nozzle, a lever positioned in front of said nozzle and adapted to control the discharge of liquid therethrough, means to move said lever responsive to variations of condition in the medium to be controlled, a movable mechanism, means to progressively alter the position of said movable mechanism, and means arranged to transmit the motion of said mechanism to said lever.

8. An apparatus for automatic control, a main control member, a liquid pressure operated servo-motor to regulate said control member, actuating means, a relay, a supply of liquid for said actuating means, means to conduct liquid from said actuating means to said servo-motor, means to conduct liquid from said actuating means to said relay and discharge the same in a jet, a baffle plate associated with said relay to control said jet, means acting on said baffle plate responsive to variations of conditions in the medium to be controlled, a progressively changing mechanism and means acting on said baffle plate in accordance with changes in said progressively changing mechanism.

9. An apparatus for automatic control, a main control member, a liquid pressure operated servo-motor to regulate said control member, actuating means, a relay, a supply of liquid for said actuating means, a conduit connecting said actuating means with said servo-motor, a valve member in said actuating means adapted to control the flow of liquid to said servo-motor, a conduit connecting said actuating means with said relay, means whereby changes in pressure in said last mentioned conduit control the operation of said valve member, a member to effect said last mentioned changes of pressure, means to actuate said member responsive to impulses in the medium to be controlled, a movable mechanism, means to progressively alter the position of said movable mechanism and means to transmit the motion of said mechanism to said member.

10. In an apparatus for automatic control the combination of a main control member, a liquid pressure operated servo-motor to regulate said main control member, a relay to indirectly control said servo-motor, a continuous jet of liquid associated with said relay, a baffle plate to control said jet, means acting on said baffle plate responsive to variations of condition in the medium to be controlled, a movable mechanism, means to progressively alter the position of said movable mechanism, means arranged to transmit the motion of said mechanism to said lever and means to adjust the position of said movable mechanism with respect to said lever.

11. A method of automatic control which comprises regulating a stream of liquid in response to variations in that which is to be controlled and in response to changes in a progressively changing mechanism, controlling the flow of a second liquid by means of the first named liquid and regulating the medium to be controlled by the second named liquid.

12. A method of automatic control which comprises throttling a jet of liquid in response to variations in that which is to be controlled and in response to changes in a progressively changing mechanism, controlling the flow of a second liquid by means of the first named liquid and regulating the medium to be controlled by the second named liquid.

In testimony whereof I affix my signature.

RAGNAR CARLSTEDT.